United States Patent
Dube

(10) Patent No.: US 9,667,786 B1
(45) Date of Patent: May 30, 2017

(54) DISTRIBUTED COORDINATED SYSTEM AND PROCESS WHICH TRANSFORMS DATA INTO USEFUL INFORMATION TO HELP A USER WITH RESOLVING ISSUES

(71) Applicant: IPSOFT, Inc., New York, NY (US)

(72) Inventor: Chetan Dube, New York, NY (US)

(73) Assignee: IPSOFT, INC., New York, NY (US)

(*) Notice: Subject to any disclaimer, the term of this patent is extended or adjusted under 35 U.S.C. 154(b) by 0 days.

(21) Appl. No.: 14/508,495

(22) Filed: Oct. 7, 2014

(51) Int. Cl.
*H04M 3/00* (2006.01)
*H04M 3/493* (2006.01)
*G10L 21/00* (2013.01)
*H04M 3/51* (2006.01)
*H04M 3/523* (2006.01)
*G06F 17/27* (2006.01)

(52) U.S. Cl.
CPC .......... H04M 3/4936 (2013.01); G10L 21/00 (2013.01); H04M 3/5183 (2013.01); H04M 3/5232 (2013.01)

(58) Field of Classification Search
CPC ...... H04M 3/51; H04M 3/5175; H04M 3/493; H04M 3/5183; G06F 17/2785; G06F 17/277; G06F 17/271; G06F 17/28; G06F 17/2872; G06F 17/2755; G06F 17/27; G06F 17/30684; G06F 17/2881; G06F 17/2705; G06F 17/306; G06F 8/427; G06F 17/274; G06F 17/30401; G06F 17/30595; G10L 15/1822; G10L 15/22; G10L 15/26; G10L 2015/088

USPC ..... 379/265, 266, 88.01; 704/9, 2, 257, 275, 704/4, E15.018
See application file for complete search history.

(56) References Cited

U.S. PATENT DOCUMENTS

| | | | |
|---|---|---|---|
| 4,888,005 A | 12/1989 | Dingeman et al. | |
| 5,220,595 A | 6/1993 | Uehara | |
| 5,402,524 A | 3/1995 | Bauman et al. | |
| 5,651,055 A | 7/1997 | Argade | |
| 5,757,899 A | 5/1998 | Boulware et al. | |
| 5,841,949 A | 11/1998 | Nakaya et al. | |
| 6,377,944 B1* | 4/2002 | Busey et al. | |
| 6,594,649 B2 | 7/2003 | Sadakuni | |
| 6,895,083 B1* | 5/2005 | Bers | H04M 3/5232 379/266.02 |
| 7,016,843 B2 | 3/2006 | Fitzpatrick et al. | |

(Continued)

*Primary Examiner* — Ahmad F Matar
*Assistant Examiner* — Kharye Pope
(74) *Attorney, Agent, or Firm* — Pearl Cohen Zedek Latzer Baratz LLP

(57) ABSTRACT

One embodiment relates to a computerized process for assisting a user in obtaining help from a help desk comprising a plurality of steps. One step can involve connecting the user with a computer network. Another step involves presenting the user with a plurality of questions. Another step involves analyzing a plurality of answers provided by the user by comparing said plurality of answers with a plurality of answers stored in a database. Another step involves determining using a microprocessor whether to connect a user with a live agent and connecting the user with a live agent by switching to a telephone network after determining via a predetermined score that the user needs further assistance. Ultimately, through a series of steps the system becomes more agile and intelligent thereby becoming a dynamic system which can change the process for assisting a user based upon the satisfaction of the user.

13 Claims, 12 Drawing Sheets

(56) References Cited

U.S. PATENT DOCUMENTS

| | | | |
|---|---|---|---|
| 7,305,345 B2* | 12/2007 | Bares et al. | 704/275 |
| 7,340,393 B2 | 3/2008 | Mitsuyoshi | |
| 7,451,079 B2 | 11/2008 | Oudeyer | |
| 7,894,586 B2 | 2/2011 | Gross et al. | |
| 8,126,832 B2 | 2/2012 | Spring | |
| 8,379,830 B1* | 2/2013 | Naik | H04M 3/493 379/265.02 |
| 8,463,025 B2 | 6/2013 | Melvin et al. | |
| 8,494,936 B2 | 7/2013 | Brenner | |
| 8,583,574 B2 | 11/2013 | Rodriguez | |
| 2003/0144846 A1* | 7/2003 | Denenberg | 704/277 |
| 2005/0069122 A1* | 3/2005 | Lin | 379/265.01 |
| 2005/0105712 A1* | 5/2005 | Williams et al. | 379/265.02 |
| 2006/0179022 A1 | 8/2006 | Holland | |
| 2006/0195321 A1* | 8/2006 | Deligne et al. | 704/257 |
| 2007/0025540 A1* | 2/2007 | Travis | 379/219 |
| 2007/0036332 A1* | 2/2007 | Busayapongchai | 379/265.09 |
| 2007/0043571 A1* | 2/2007 | Michelini et al. | 704/270.1 |
| 2007/0116189 A1* | 5/2007 | Clawson | H04M 11/04 379/37 |
| 2007/0208569 A1* | 9/2007 | Subramanian | G10L 19/0018 704/270 |
| 2007/0288406 A1* | 12/2007 | Visel | 706/14 |
| 2007/0299802 A1 | 12/2007 | Kwok | |
| 2008/0221892 A1* | 9/2008 | Nathan et al. | 704/257 |
| 2008/0267386 A1* | 10/2008 | Cooper | 379/265.06 |
| 2008/0312903 A1* | 12/2008 | Pineda | G06F 3/0481 704/8 |
| 2009/0106019 A1* | 4/2009 | Chen et al. | 704/9 |
| 2009/0306967 A1* | 12/2009 | Nicolov | G06Q 30/02 704/9 |
| 2009/0313019 A1 | 12/2009 | Kato et al. | |
| 2010/0036660 A1* | 2/2010 | Bennett | G10L 17/26 704/231 |
| 2010/0088088 A1 | 4/2010 | Bollano et al. | |
| 2010/0091954 A1* | 4/2010 | Dayanidhi | G10L 15/01 379/88.04 |
| 2010/0114899 A1* | 5/2010 | Guha | G06F 17/30867 707/741 |
| 2011/0212428 A1 | 9/2011 | Baker | |
| 2014/0046891 A1 | 2/2014 | Banas | |
| 2014/0052448 A1 | 2/2014 | Krishnan et al. | |
| 2014/0093062 A1* | 4/2014 | McCormack et al. | 379/265.12 |
| 2014/0106330 A1 | 4/2014 | Billhardt | |
| 2014/0220526 A1* | 8/2014 | Sylves | G06Q 30/0201 434/238 |
| 2014/0236598 A1* | 8/2014 | Fructuoso | G10L 13/04 704/249 |
| 2015/0100521 A1* | 4/2015 | Kozloski | G06F 17/2785 706/11 |
| 2015/0161241 A1* | 6/2015 | Haggar | G06F 17/30654 707/723 |
| 2015/0193429 A1* | 7/2015 | Bohra | G06N 5/04 704/9 |
| 2015/0310112 A1* | 10/2015 | Allen | G06F 17/30654 706/58 |
| 2015/0371137 A1* | 12/2015 | Giffels | G06N 5/02 706/46 |

* cited by examiner

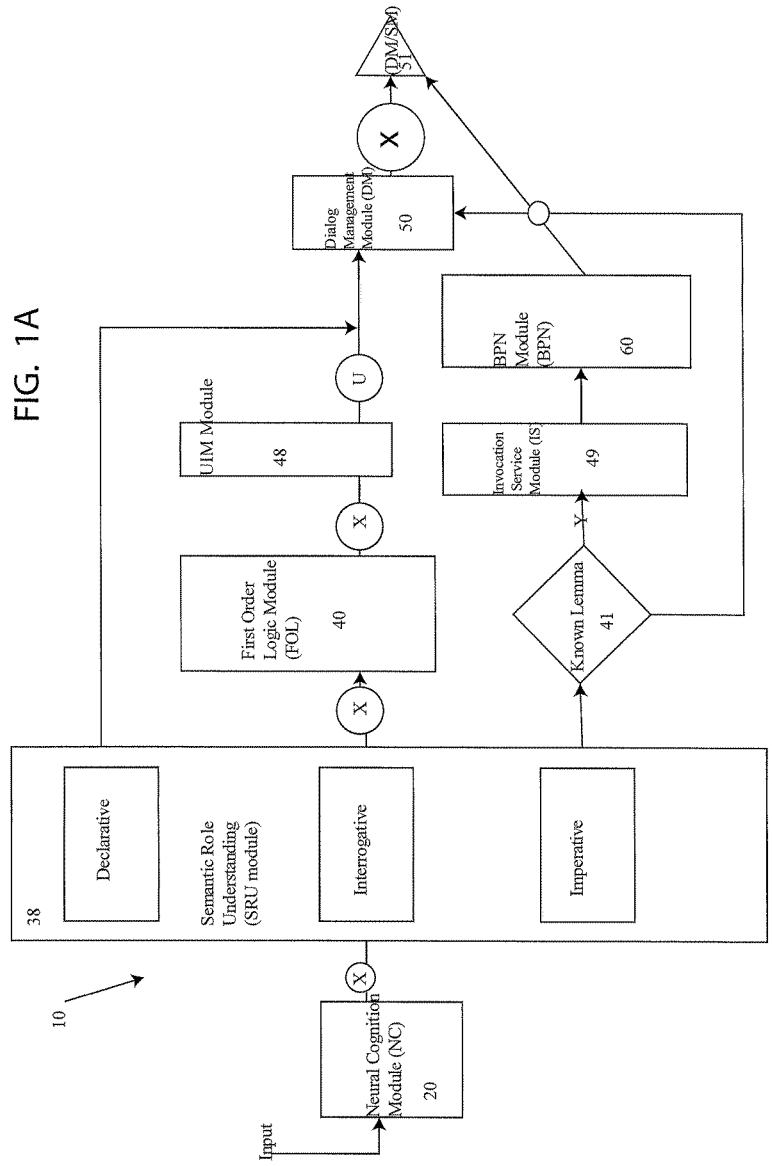

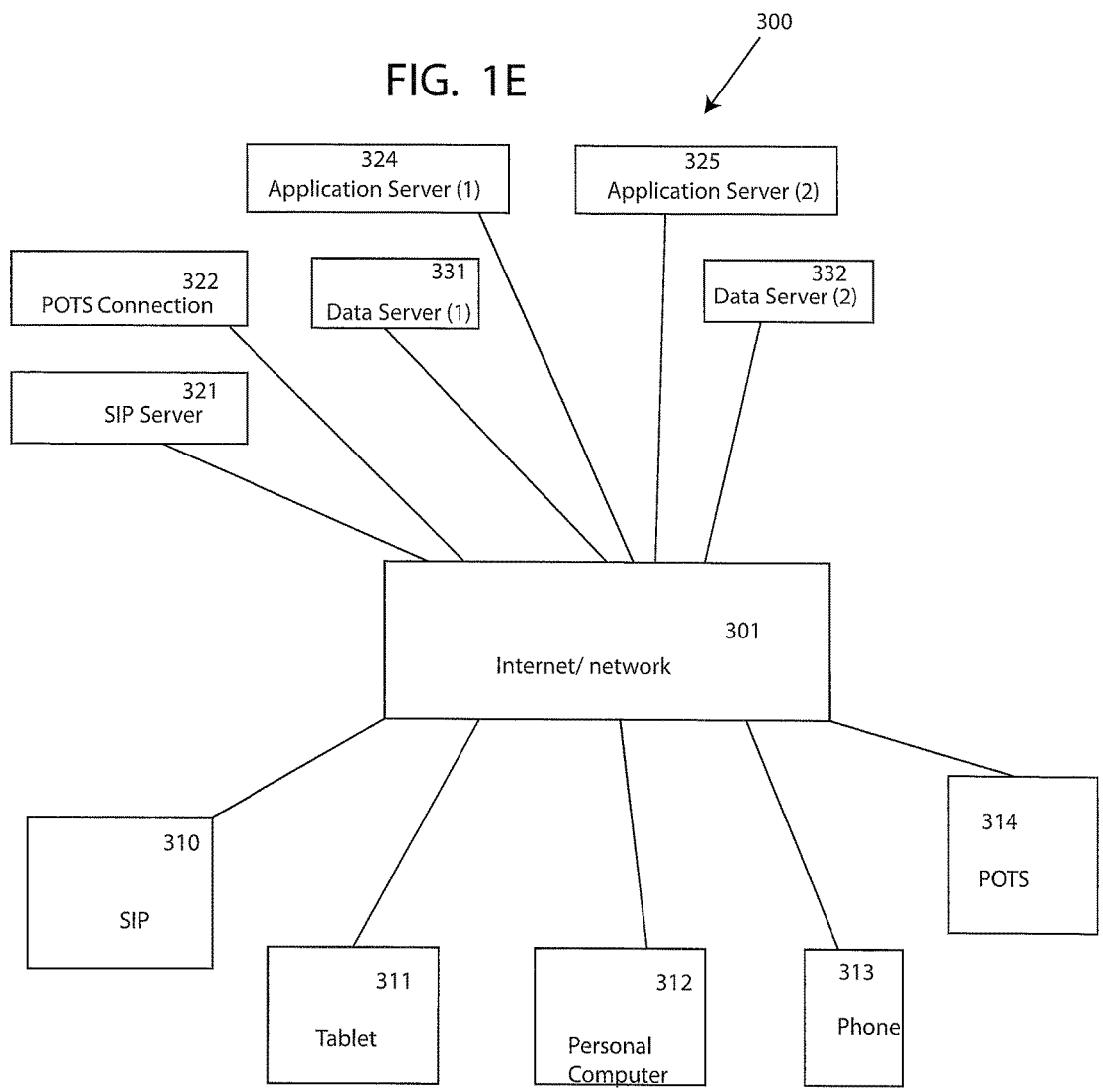

DISTRIBUTED COORDINATED SYSTEM AND PROCESS WHICH TRANSFORMS DATA INTO USEFUL INFORMATION TO HELP A USER WITH RESOLVING ISSUES

BACKGROUND

One embodiment relates to a system and process for aiding a user in obtaining online help from a system. Previously, if one person wanted assistance from a computer network that person would have to proceed through a preset and static listing of paths for which the user would follow. Those paths would be pre-set and generally not dynamic or changeable automatically, based upon the satisfaction of the user. Therefore, users who would call or contact a help desk could be stuck within an unhelpful process and become frustrated with the process because this process was not dynamic. Therefore there is a need for a dynamic help desk system which learns after at least one iteration how to best service a user.

SUMMARY

One embodiment relates to a computerized process for assisting a user in obtaining help from a help desk comprising a plurality of steps. One step can involve connecting the user with a computer network. Another step involves presenting the user with a plurality of questions. Another step involves analyzing a plurality of answers provided by the user by comparing the plurality of answers with a plurality of answers stored in a database. Another step involves determining, using a microprocessor, whether to connect a user with a live agent and connecting the user with a live agent by switching to a telephone network after determining via a predetermined score that the user needs further assistance.

In at least one embodiment, the step of connecting the user with a computer network includes connecting the user with a computer network via a public telephone system.

In at least one embodiment, the step of connecting the user with a computer network comprises connecting the user to a computer network via text input.

In at least one embodiment, the step of analyzing a plurality of answers comprises parsing a phrase or words presented by the user for different parts of speech.

In at least one embodiment, the different parts of speech comprise at least one of a subject, a predicate, a verb and an object.

In at least one embodiment, the step of analyzing a plurality of answers comprises determining a sentence type expressed by the user.

In at least one embodiment, the sentence type comprises at least one of a declarative sentence, an imperative sentence and an interrogative sentence.

In at least one embodiment, the step of presenting at least one additional question occurs after determining the sentence type.

In at least one embodiment, there is a step of using a microprocessor to determine a tone of expression of a sentence type.

In at least one embodiment, there is a step of formulating a response to the sentence based upon a tone of expression of the sentence type.

In at least one embodiment, there is a step of determining a score for efficiency in resolving a user's issue based upon a time period and number of questions and answers necessary to resolve the issue.

In at least one embodiment, the step of determining a score includes determining a score based upon emotional reaction of the user.

In at least one embodiment, the process further comprises the step of retaining a path for resolving an issue by presenting the path of answers when the issue is presented by the user.

In at least one embodiment, the process further comprises the step of using the microprocessor to modify the path by recording either a different step in the path, or adding additional steps in the path after connecting the user with the live agent.

In at least one embodiment, the process further comprises the steps of providing an index which is used by the microprocessor to determine whether the sentence is a declarative sentence, an interrogative sentence or an imperative sentence.

In at least one embodiment, the process further comprises the steps of providing an index which is used by the microprocessor to determine a best course of action in assisting a user in resolving an issue.

In at least one embodiment, the step of determining a sentence type comprises using a neural cognition device comprising a microprocessor to determine a type of sentence issued by the user.

In at least one embodiment, the step of determining a type of sentence issued by the user comprises using a semantic role understanding machine to determine a type of sentence.

In at least one embodiment, the process comprises the step of using a first order logic to answer any interrogative question presented by the user.

In at least one embodiment, the process includes the step of determining a known lemma of an imperative statement and then selectively invoking an invocation service based upon a type of lemma.

In at least one embodiment, the process comprises a step of invoking a dialog management service to provide answers to users based upon the types of sentences input by the user.

To perform any one of the steps indicated above, there can be a system suitable for users to perform the above steps. In at least one embodiment, there can be a system for assisting a user in obtaining help for a user comprising a communication management service, a brokering orchestration service, a semantic role understanding service, an invocation service, an unstructured information management service, a first order logic service and a dialog management service, wherein the communication management service, the brokering orchestration service, the semantic role understanding service, the invocation service, the unstructured information management service, the first order logic service and the dialog management service are coupled together in a computer network.

In at least one embodiment, the system can also comprise at least one database server coupled to the computer network and in communication with the computer network to provide information to the computer network.

In at least one embodiment, the at least one database server comprises at least one table to determine a score of at least one path for resolving a user's issues.

In at least one embodiment, the database server comprises at least one table to determine a score of at least one statement presented to the system by the user to determine whether to connect the user with the live agent.

In at least one embodiment, the system reads natural language and translates it into machine operable constructs. These constructs are either data elements in neural ontology or the first order logic predicates. Once translated, the programs can work on the knowledge acquired to achieve desired effect.

In at least one embodiment, the system learns by inductive learning techniques by observing the interaction between a user and an agent servicing the user. The system dynamically builds a mind map representing the process that the agent used to satisfy the user's request. Once learnt on the fly, the system can then process the request independently.

In at least one embodiment, the system's emotional ontology is uniquely architected on the basis of a 3-dimensional PAD (pleasure, arousal and dominance) modeling system. The emotion is represented as an integration of sentimental upgrades that our brain makes based on conversations. The reading of this PAD can be from pitch, tone, frequency of the read voices through the use of words, or perspective in conversation or other user input into the system.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1A is a schematic block diagram of the system for assisting a user in resolving an issue;

FIG. 1E is a schematic block diagram of a computer network for assisting a user in resolving an issue;

DETAILED DESCRIPTION

Figure 1B:
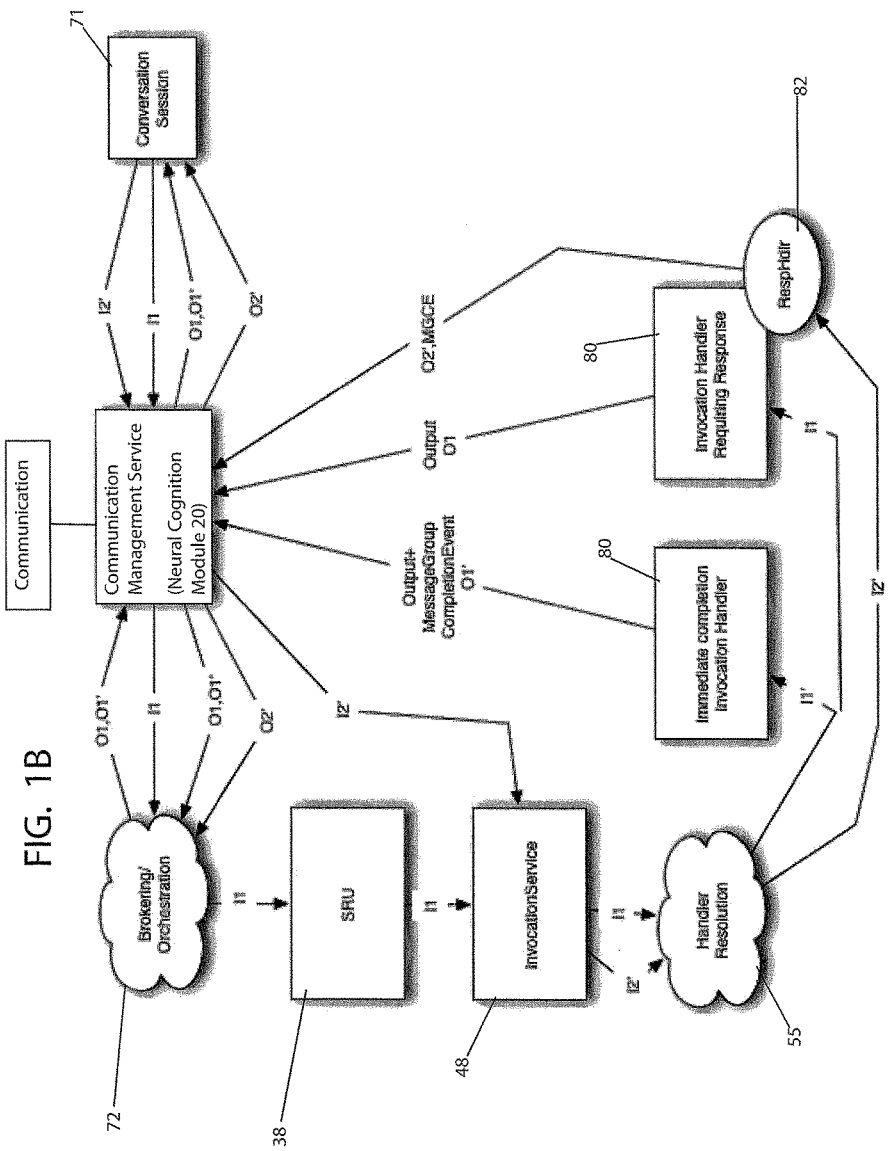
FIG. 1B is a schematic block diagram of the system for assisting a user in resolving an issue.

Referring in detail to the drawings, FIG. 1A is a schematic block diagram of the system for assisting a user in resolving an issue. For example, there is a neural cognition processor 20 which is configured to receive an input from a user. The input can be in the form of a text input or via a verbal or oral input such as through a connection via a telephone line. The neural cognition processor 20 can be in the form of a computer which is configured to have at least one microprocessor (see for example microprocessor 202 and 203 in FIG. 1C) and at least one memory (see for example memory 204 in FIG. 1C). The processing performed by the neural cognition module is shown in greater detail in FIG. 2.

Next the information is passed to a semantic role understanding module 38 (See FIG. 3) which is configured to process the information received from the neural cognition processor 20. The information received into the semantic role understanding module 38 is then parsed by the microprocessor (See for example microprocessor 202 and 203 in FIG. 1C). This semantic role understanding module 38 uses its microprocessor to determine that the statements or information input into the module can be discerned and parsed once it is input into this module. The process performed by the semantic role understanding module 38 is shown in greater detail in FIG. 3.

The communication input by the user into the semantic role understanding module 38 is then based upon the type of input. For example, if the semantic role understanding module determines that the communication input is a declarative statement then the information passes to a dialog management module 50. If the communication is an interrogative, it passes to a first order logic module 40 and then on to an unstructured information management module 48 and then on to a dialog management module 50. Alternatively, if the communication is an imperative statement, then this information is passed to an invocation service 49, and then on to the BPN module 60.

If the imperative statement includes a known lemma then the process can skip the invocation service module 49 and the BPN module 60 and proceed directly to the dialog management module 50.

At the different stages, the system can stop if the statement provided by the user is a sufficient response to resolve the issue or if the statement issued by the user is a useable response. Once this information is handled by the dialog management module 50, this information is passed onto the dialog management session management module 51.

In at least one embodiment, each of these modules such as the neural cognition module 20, the semantic role understanding module 38, the first order logic module 40, the invocation service module 48, the unstructured information management module 49, the dialog management module 50, and the dialog session management module 51 can housed on a single application server and assigned to a single processor. Alternatively, each of these modules can be assigned to a separate processor on a single application server or these modules each can be assigned to separate application servers or they can be load balanced among multiple application servers such as that shown in FIG. 1D so that in at least one embodiment, each of the above described modules is housed on its own separate application server. In at least one embodiment, these application servers can comprise the components disclosed in FIG. 1C.

FIG. 1B shows how a communication management service such as a neural cognition module 20 handles incoming communications into the system. For example, when a communication is presented to the system such as to neural cognition module 20, it can either start a conversation session 71, or if the communication meets predetermined criteria then this information can be passed to a brokering or orchestration session 72. If it is necessary for the information in this session to be parsed, then this information is then passed on to the semantic role understanding module (SRU)

38 (FIG. 1A) for further processing. The processing steps shown in the neural cognition module are shown in greater detail in FIG. 2.

If the information passed from the SRU 38 is passed to the invocation service module 49, it is then determined by the invocation service whether the information requires immediate completion so that this information then passes to the invocation handler 80, or whether the information should be passed to a response handler 82 for further communication and analysis. Thus, FIG. 1B shows the different paths that the information created from a communication session can follow, once this information is input into the system. As indicated above, with the modules, both the invocation handler 80 and the response handler 82 can be implemented along with other modules with a single application server, or implemented separately on different servers for the purpose of load balancing.

Figure 1C:
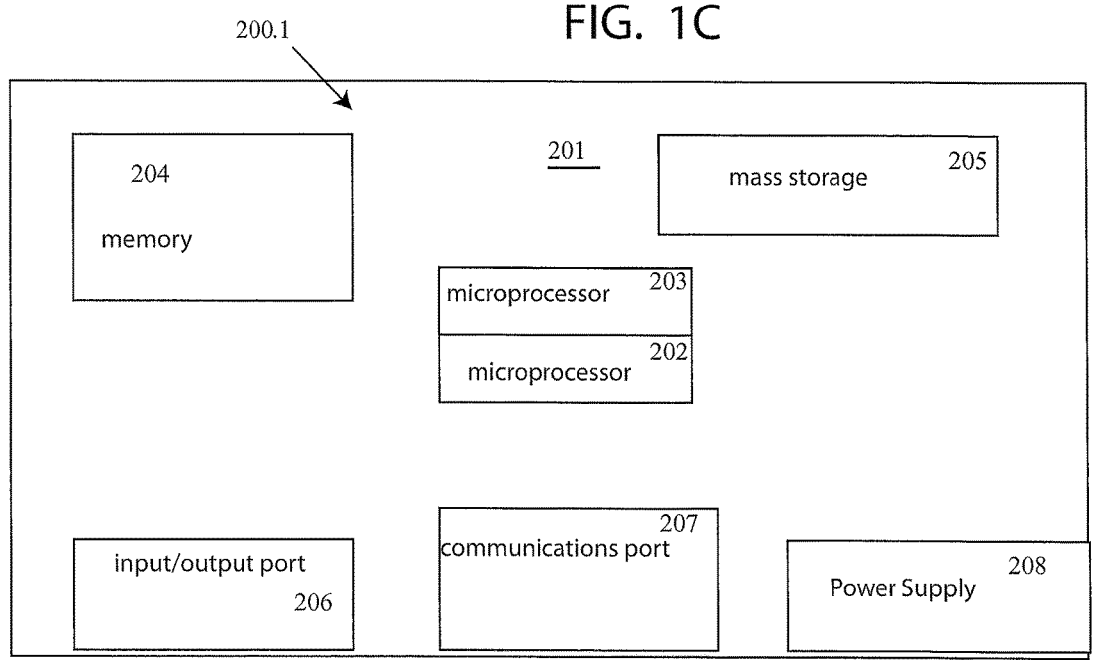
FIG. 1C is a schematic block diagram of a computer system for assisting a user in resolving an issue.

FIG. 1C shows a schematic block diagram of a computer type system such as a system that can be used as an application server for each of these modules listed above or as a database server. For example, the computer 200.1 or server includes a motherboard 201, a microprocessor such as microprocessor 202 or in at least one embodiment an additional microprocessor 203. Thus, the computer 200.1 can include a single microprocessor, multiple microprocessors or a multi-core processor. The processor can be an Intel® based processor or any other type of processor known in the art.

In addition there is a memory 204 which can be in the form of a EEPROM or flash memory, a mass storage device 205, such as in the form of a hard drive, which can be either a solid state drive or non-solid state drive which can serve as read only memory. In addition, an input/output port 206, a communications port 207, and a power supply 208 are also present. These components such as microprocessor(s) 202, 203, memory 204, mass storage 205, input output port 206, communications port 207, and power supply 208 are coupled to each other communicatively and electrically via motherboard 201. Thus, information stored in mass storage device 205 can be called from this mass storage device and placed within memory 204, via instructions from microprocessor(s) 202, and 203. Instructions sent from microprocessor(s) 202, and 203 can be sent through input/output port 206, or through communications port 207. Once the information is loaded into memory 204, it can be processed, analyzed and transformed by using one or more algorithms disclosed in the following FIGS. so that the information can be processed by one or more of the microprocessors 202 or 203 in any one of the application servers.

Information can be input into these application servers either in the form of typed data input or voice input through communications port 207 or typed directly into the system through the use of input/output port 206.

Figure 1D:
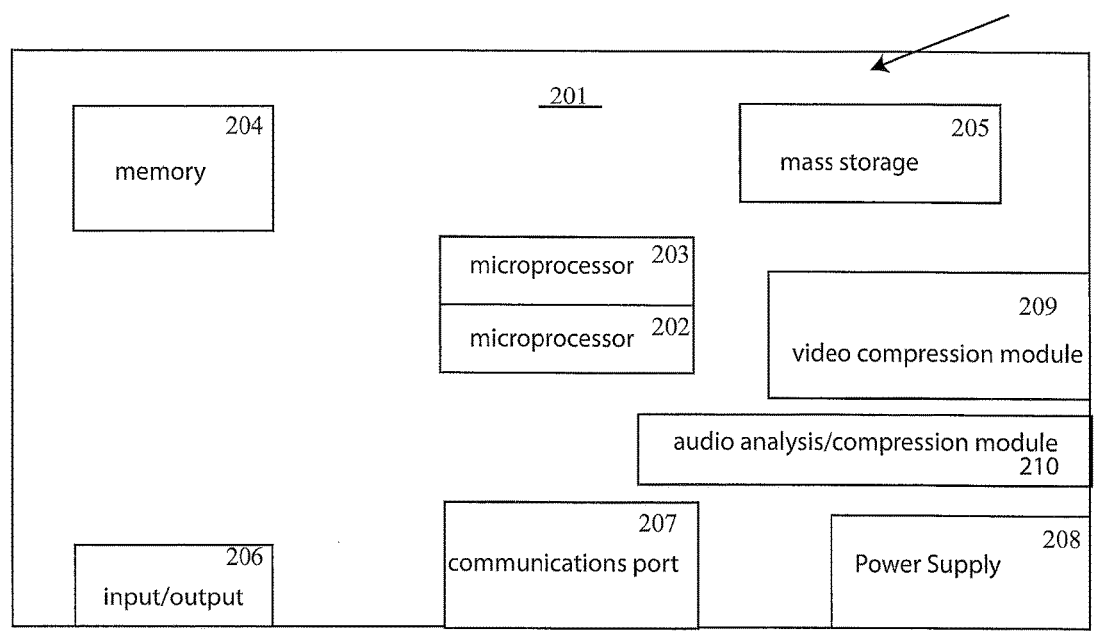
FIG. 1D is a schematic block diagram of a computer system for assisting a user in resolving an issue.

FIG. 1D shows an alternative server which includes both a video compression module 209, and/or an audio analysis or compression module 210 as well. This customized computer 200.2 can be used for faster video or audio calculations which are necessary to keep the calculations running in the system. This type of computer 200.2 can be used as a neural cognition module 20, a semantic role understanding module 38, a first order logic module 40, and invocation service module 49, an unstructured information management module 48, a BPN module 60, a dialog management module 50 or a DM/SM module 51.

FIG. 1E is a schematic block diagram of the system for applying the algorithms in the following FIGS. For example, there is shown a connection of computers in a computer network 300 which includes the internet 301 which has a plurality of distributed computers either used for input or processing of information associated with the FIGS. below. For example, there is a SIP computer 310 input for receiving information from voice over IP communications. In addition there is a tablet computer 311 which can be in the form of a portable computer for allowing a user to input information into the system. In addition there can be a personal computer 312 configured to communicate through the internet, a phone 313 such as a mobile telephone such as a smart phone, and a POTS (Plain old telephone line) connection 314 which is in connection with the internet 301 as well.

In addition, there can be a plurality of different servers such as a SIP server 321, a POTS communication connection 322, at least one first application server 324, or additional application server 325, a first database server 331 or a second database server 332. Each of the above computers include electronic components such as the electronic components disclosed by computers 200.1 and 200.2. Thus each of the application servers and/or database servers can include at least one or more microprocessors 202, 203, memory 204, mass storage 205, input/output ports 206, power supply 208, or communications port 207. Thus, these application servers 324 and 325 are programmed to function as one or more modules 20, 38, 40, 48, 49, 50, 51, or 60.

Figure 2:
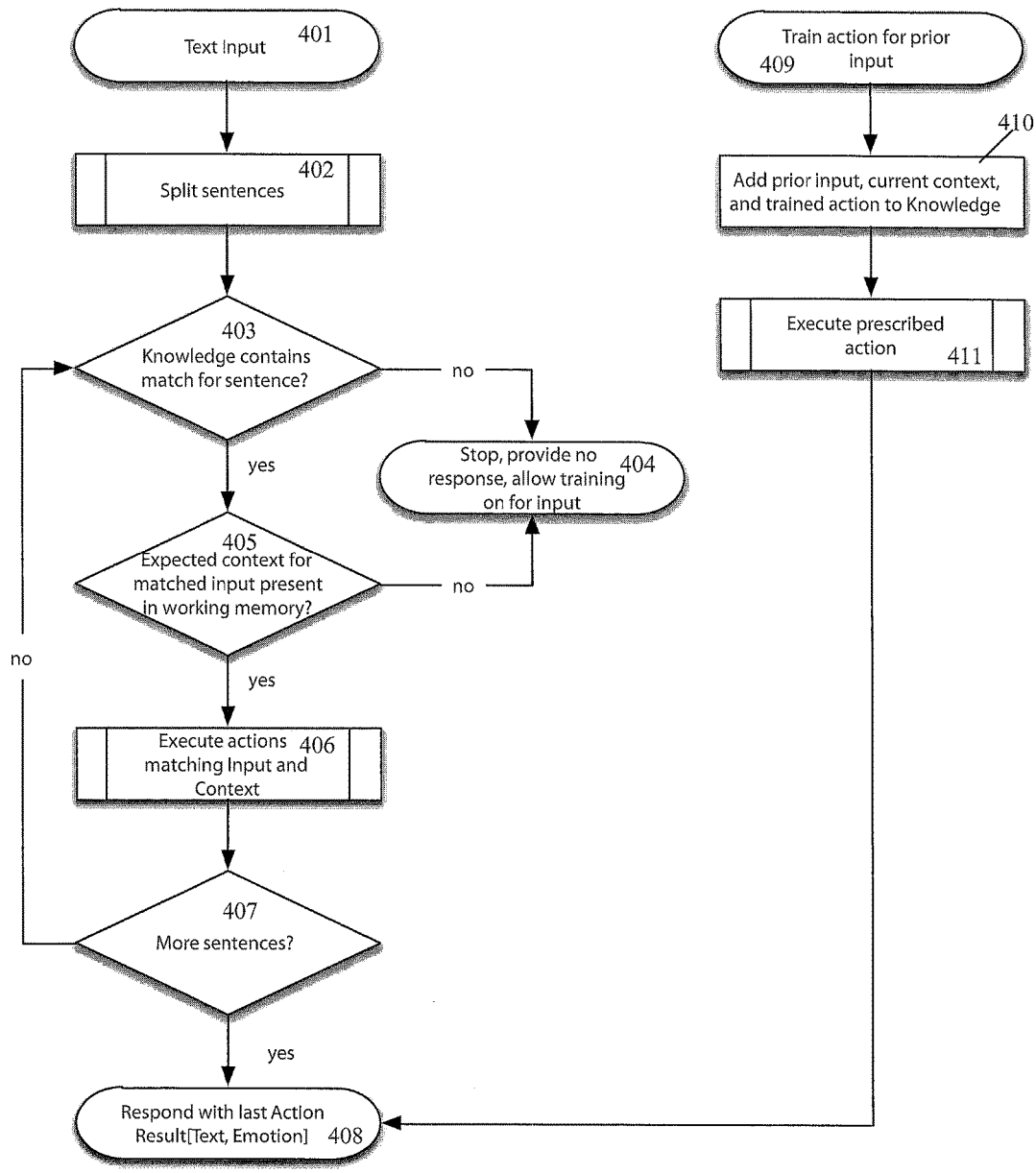
FIG. 2 is a flow chart for the process for following neural cognition.

FIG. 2 shows the algorithm or process for intake of information into the system and for the initial stage of processing this information in the neural cognition module 20 (See FIG. 1). For example, in step 401 the system can intake information in the form of text input. This text input can start as a text statement, question or phrase input into the system in the form of a communication (See also FIG. 1B). This type of communication can also be in the form of speech or oral communication which is then transcribed into text for further analysis via any one of application servers 324 or 325 or via a separate text to a speech server. Once the information is input into the system such as into an application server 324, the information which can be in the form of words, phrases or sentences can be split into sub parts or smaller parts in step 402. Next, in step 403, the system analyzes this information and matches this information stored in the system such as in a database such as in any one of database servers 331, or 332.

Next, in step 404 the system would stop, and provide no response and allow training on input. This training can be in the form of learning to parse the words or information of sentences and determining which parts of the sentences are important. Next, the system in step 405 can determine the expected content for the matched input which is present in the working memory. This step essentially determines which information is passed to the semantic role understanding module (SRU) 38. If the information output to the SRU 38 does not match the information input into the system then this information is re-analyzed. This step can occur during the conversation session 71 in FIG. 1B and in the brokering and orchestration session 72 shown in FIG. 1B. If the context is a match, next, in step 406 the system executes actions matching input and the context of the input. This step is conducted during the brokering and orchestration session 72 shown in FIG. 1B. Next, in step 407 the system can then gather further information by separating the information into different sentences and also gathering additional sentences in a conversation session 71. If more sentences are required to be analyzed, then the system proceeds to step 403. If no additional sentences are necessary, then the system proceeds to step 408 for further processing.

Simultaneously, the system is reviewing the information input, and is providing a training action in step 409 to determine how to parse and recognize the prior input. This step can include parsing statements for known lemmas (See FIG. 1A) or for relationship words ((See FIG. 6B). Next, in step 410 the system adds prior input into current context and uses trained action to expand the knowledge. Next in step 411 the system executes the prescribed action. This prescribed action can be plotted as a step in a subroutine model such as model 600 in FIG. 6A.

Figure 3:
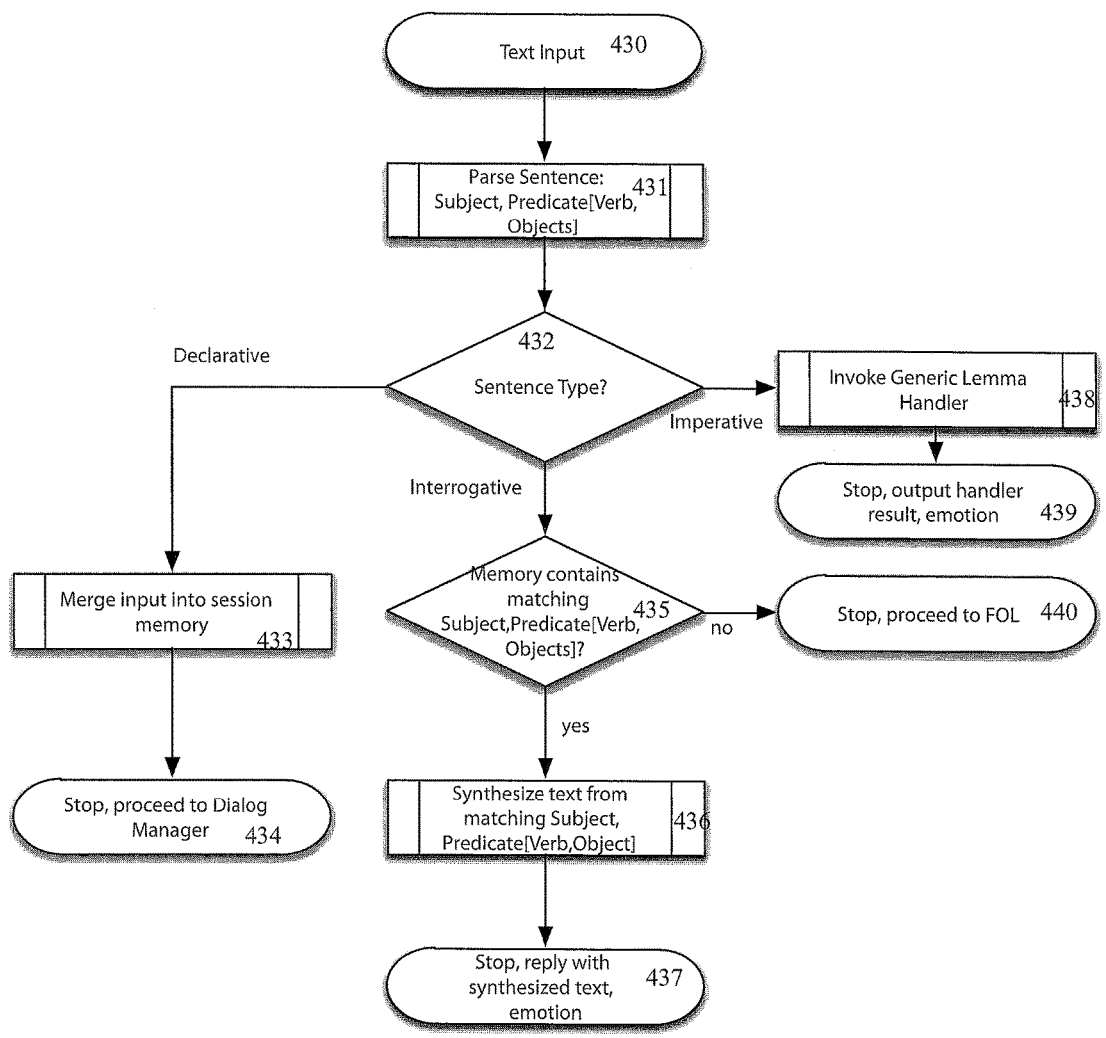
FIG. 3 is a flow chart for a series of steps for following semantic understanding.

FIG. 3 shows the process for a series of steps for the semantic role understanding (SRU) module 38. For example, this process includes receiving a text input in step 430. Next, in step 431, the system parses the sentence structure including the subject, the predicate, the verb and the objects. Next, in step 432, the system determines the sentence type. This sentence type parsing is determined using a particular machine such as a semantic role understanding unit module (SRU) 38. The three types of statements, sentences or phrases that can be discovered are: declarative, interrogative, and imperative. If the sentence is a declarative sentence, then in step 433 the system merges input into session memory such as memory 204. This step can occur in any one of computers 200.1 or 200.2. Next the process can proceed to step 434 wherein it would stop and engage the dialog manager 50.

Alternatively, if the system determined that the sentence type was an interrogative sentence, then the system would proceed to step 435 wherein it would access memory in step 435 to determine whether there was a matching subject, predicate, verb or object. If the system cannot recognize the presence of a recognizable part of speech such as a subject, predicate, verb or object, then the system would proceed to the first order logic module 40 in step 440.

Alternatively, if the system recognized the information relating to the subject, predicate verb or object in at least one embodiment as being one that is stored in a database, it is then uploaded to memory for further processing. Once the information that is taken into the system is matched with the existing information in the database, the system proceeds to step 436. Next, in step 436, the system would synthesize text from matching subject, predicate, verbs or objects. This step can be completed in a particular computer designed to synthesize audio or video information. For example, data from a database can be uploaded into this particular computer such as with computer 200.2 which includes all or many of the components of computer 200.1 but also includes at least one of a video compression module 209, or an audio analysis or audio compression module 210. The analysis can include text to speech parsing, and matching spoken words with the words existing on file. Next, once the information is analyzed the system would proceed to step 437 to stop and reply with synthesized text, and inflect emotion in the synthesized text. This synthesized text can be taken from or transformed from or constructed from the relationship model shown in FIG. 6B.

Alternatively, the system could invoke a generic lemma handler in step 438. In linguistics, a Lemma is essentially a word considered as its citation form together with all the inflected forms. For example, the lemma "go" consists of "go" together with "goes", "going", "went", and "gone". (See also FIG. 4)

A lemma handler also known as an invocation service module 49 would simply be a computer type device such as a computer 200.2 which is configured to determine whether the lemma is a known lemma which can be acted on by the invocation service module 49 (See FIG. 1B). Next, in step 439 the system could stop the output handler result and adjust the answer or the action based upon the emotion conveyed in the information that is input into the system.

Figure 4:
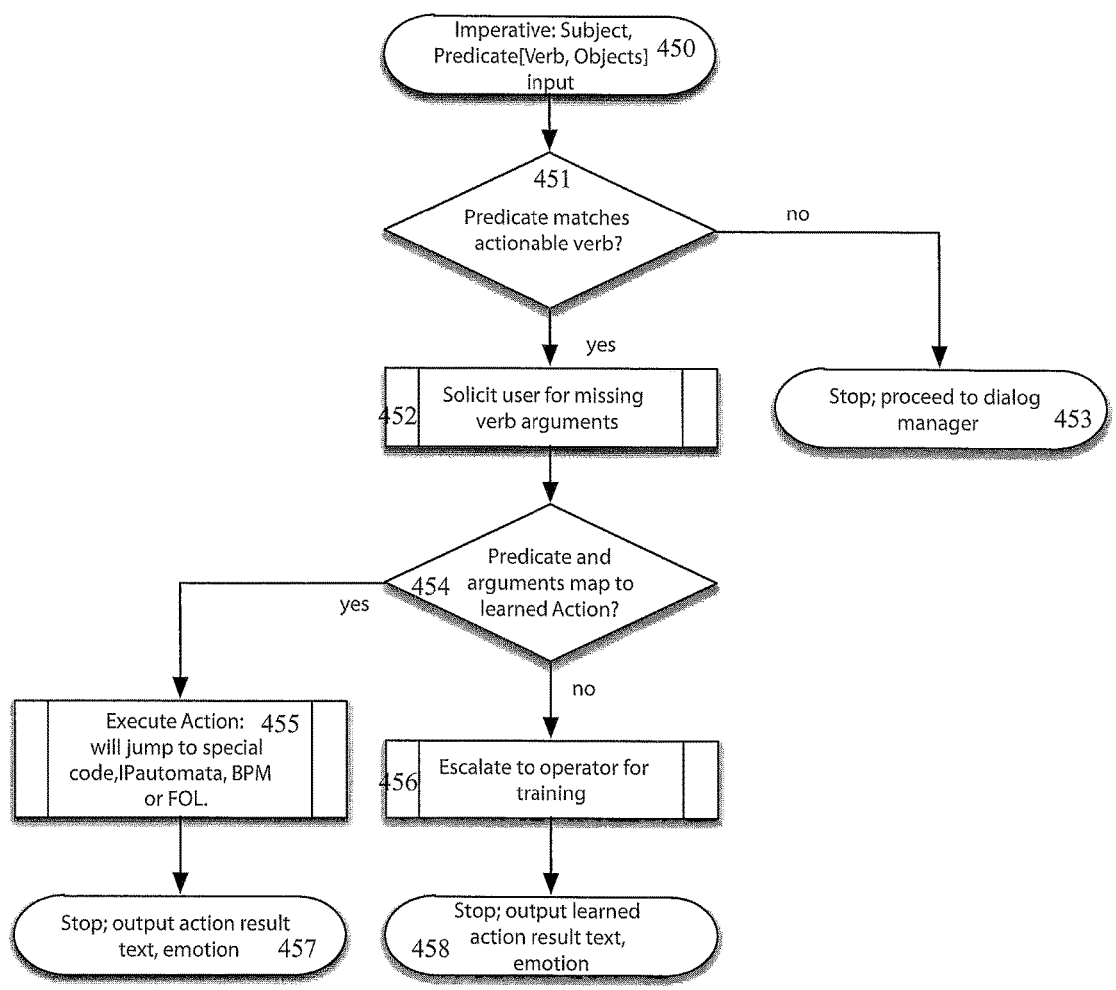
FIG. 4 is a flow chart for a series of steps relating to generic lemma handling.

FIG. 4 shows the process for the generic lemma handler 49. In this process, the lemma handler or invocation service 49 breaks the imperative statement into a subject, predicate, (verb object) in step 450 and then inputs these parts into the system. Next, in step 451, the system matches the predicate with an action verb. If there is no match created, then the system proceeds to step 453 and then stops so that it can proceed to the dialog manager 51. Alternatively, if there is a system match, then the system can proceed to step 452 to solicit the user for missing verb arguments. Next, in step 454 the system would analyze the predicate and arguments map to the learned action. If there is a learned action that is matched with these words then the system proceeds to step 455 wherein the system would execute an action and execute a pre-designed special code executing a business process network (BPN) of business process modeling BPM, or redirecting the process back to the first order logic module (40). Next, in step 457 the system would stop and the output action would result in text, wherein this text or voice would include emotion. Business process modeling (BPM) is conducted on the business process network (BPN) 60.

Alternatively, if the information received by the system was determined to not include a learned action, then the system would proceed to step 456 to escalate to the operator for training. (See FIG. 6A). This step involves automatically switching to a telephone network such as to a SIP server 321 or to a POTS communication network 322. Next in step 458 the system could also stop the process, review the operations performed by the live operator, and then record the learned action, which may include the resultant text and the emotion conveyed by the user.

Figure 5:
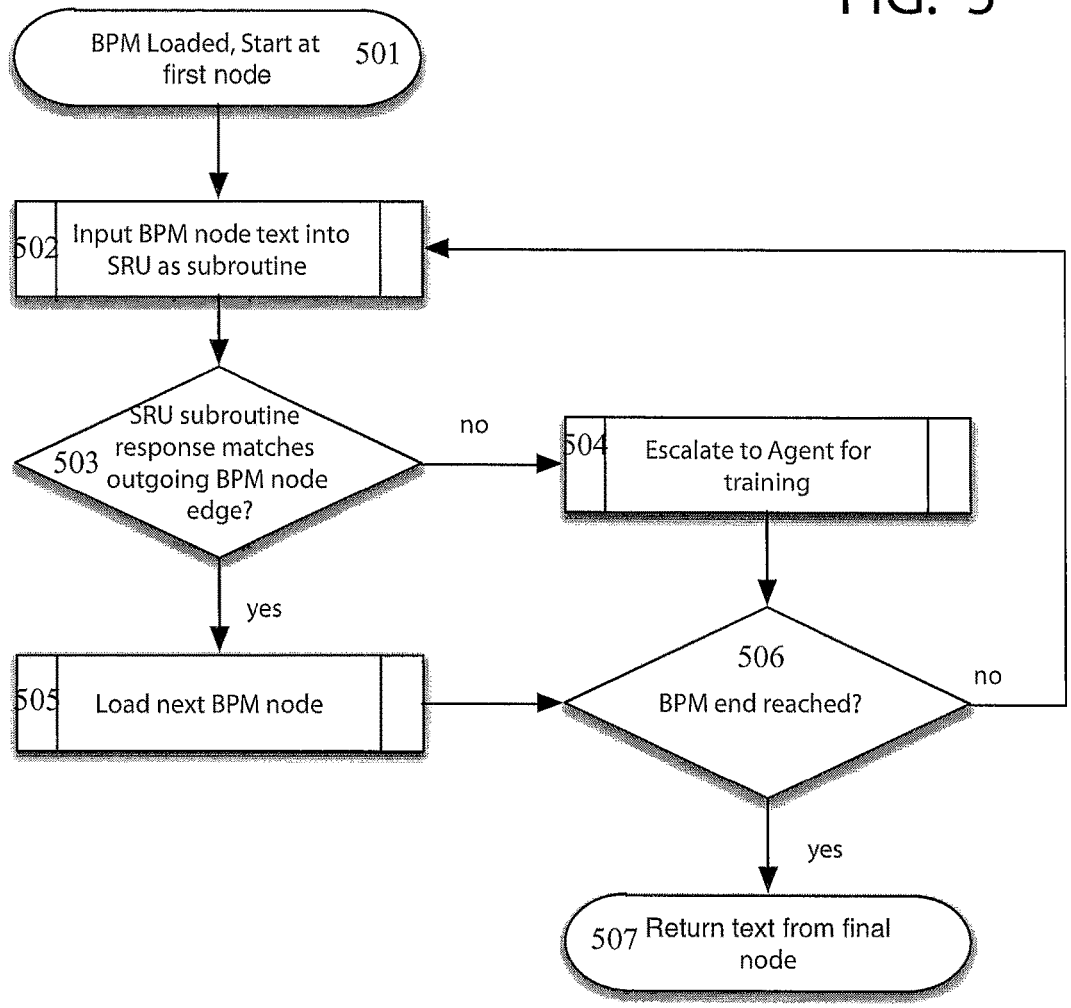
FIG. 5 is a flow chart for business process modeling.

FIG. 5 shows the process for business process modeling, wherein the learned action is modeled after a particular business process. For example, the business process modeling (BPM) could be the series of steps necessary to solve a particular problem an example is subroutine 600 shown in FIG. 6A. For example, in at least one application server can call forward the business process model which can be stored in a database server wherein this BPM model can be loaded into memory and be accessed at a first node in step 501. A pre-stored BPM model can be in the form of a model 680 shown in FIG. 6C. That first node can be any one of a neural cognition module 20, a first order logic module 40, an unstructured information module 48, an invocation service module 49, a dialog management module 50, or a dialog management/session management module 51 or a BPN module 60.

If at any one of these stages, the system is not able to immediately resolve an issue, the previously stored BPM (business process model) information is then input into the SRU module 38 as a subroutine in step 502. In step 503, A SRU subroutine is inserted into the SRU module 38 and matched with the BPM node information input in the SRU module 38. If there is a match between the SRU subroutine and the BPM subroutine information input into the SRU module 38, then the system can then load the next BPM node in step 505. Alternatively, if the SRU subroutine response does not match the outgoing BPM node edge, then the system can in step 504 escalate the discussion to an agent for further training. Thus, essentially the SRU and BPM application servers look to match the input and transform this information into a subroutine such as that shown as subroutine 600 in FIG. 6A and ultimately match it with a subroutine 680 (See FIG. 6C) to resolve an issue. If the issue is resolved, then the process ends. However, if the issue is not resolved, then the system proceeds to contact an outside agent. In this embodiment, this involves switching on the telephone network and directly connecting a user with an agent. The system then records the telephone call wherein the information is transcribed and stored in the database servers.

Step 506 follows either step 505 or step 504. This step comprises determining whether the BPM end has been reached. If it has been reached, then the system proceeds to step 507 to return text from the final node such as the dialog session management module 51. Alternatively, if the system determines that the BPM end has not been reached, then the process reverts back to step 502, wherein the BPM node is input as a text based subroutine which is to be matched with the SRU information.

Figure 6A:
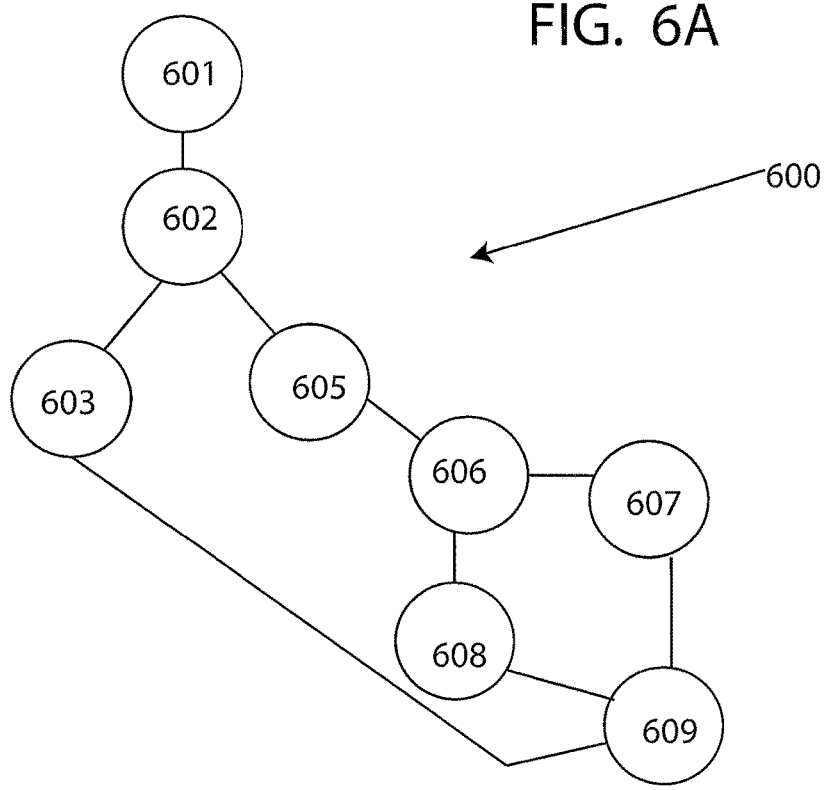
FIG. 6A is a flow chart showing a subroutine structure.

FIG. 6A shows a flow chart for an example of a subroutine or subroutine structure 600 which shows a series of decisions that can be performed by the microprocessor such as microprocessor 202 or 203 when encountering a user. When the user provides a statement, questions or answers in a first step 601, the microprocessor can then proceed to step 602 to determine whether to issue a command or an additional question. This decision is based upon the information input initially by the user. Next, once this information which can be in the form of speech, text, or other data input is analyzed in step 602, the system then either issues a command in step 603 or a further question in step 604. With a command, the system process could end if this terminates the process for decision making. Alternatively, if the system such as the microprocessor 202 or 203 issues another question, then in step 605 the user issues another statement in the form of a command or a question. The process would proceed to step 606 wherein this information is then analyzed and then transformed into either a recognizable question, or command. The system in the form of microprocessor 202 or 203 would then proceed to either steps 607 or 608 which are in the form of an additional command (step 607), or an additional question (step 608). This process repeats itself until it hits a dead end. For example, if in response to the question posed in step 608 there is an answer provided by the user in step 609 that has not been handled before, then this decision tree ends in step 610 and in at least one embodiment, in step 610 the information is then sent over to an outside agent such as a live agent. Thus, the data input into the system in the form of questions or interrogative statements or commands such as declarative or imperative statements for example, (see SRU module in FIG. 1A) which is then transformed into recorded subroutines or decision trees which are then matched or related to known decision trees or subroutines stored in a database such as in database servers 331 and/or 332. As long as entire sections or at least portions or segments of these decision trees or subroutines can be matched with previously recorded decision trees, the automated process can continue. Alternatively, if this data that is transformed into these decision trees cannot be matched, then the system proceeds to contact an outside agent for assistance such as in step 610.

Figure 6B:
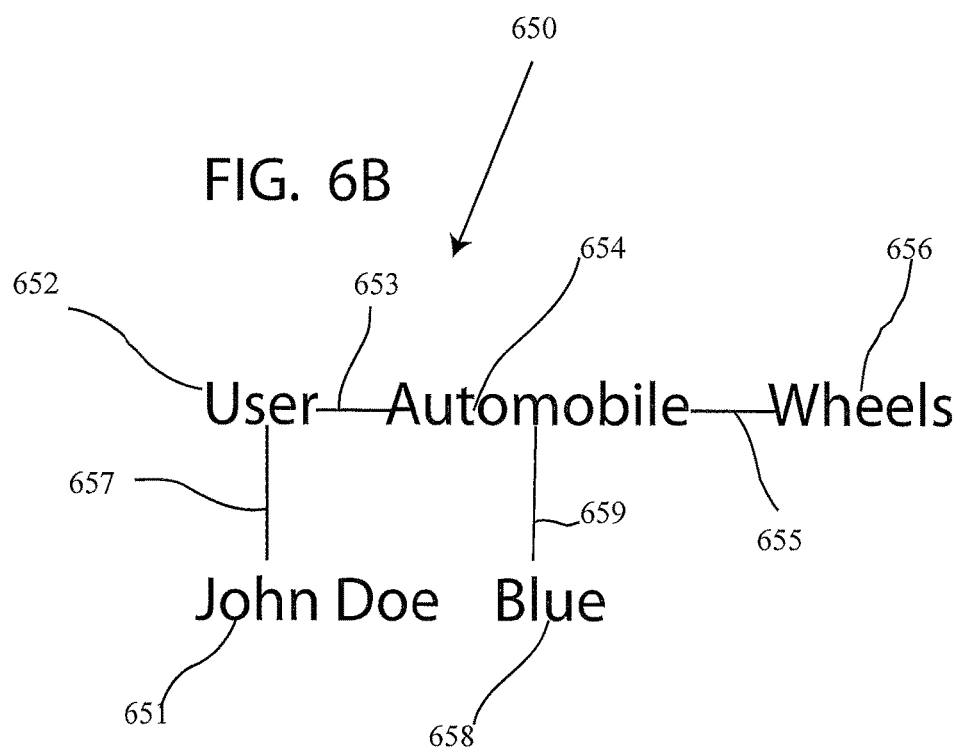
FIG. 6B is a block diagram of an example of a relationship model.

Simultaneously or alternatively, the system can also transform the data that is inserted into the system into relationship models as well. These relationship models comprise initial statements or questions provided by the user either input via text, speech, or other types of input. For example, as shown in FIG. 6B the relationship model 650 comprises a first object 652, a first modifier 651, a second object 654, and a third object 656. Any one of these objects can comprise a modifier such as a characteristic or adjective. Therefore as shown in this diagram, the first object 652 is named "John Doe" (first party), the second object 654 is an "automobile". The third object 656 are "wheels". A second modifier 658 is "blue".

This relationship model can be formed for example by the following statements provided by the user: 1) "My name is John Doe"; 2) "I have a car."; 3) "I have a blue car"; 4) "My car has wheels". This data is therefore transformed into the structure of the relationship model with ties 653, 655 and 657 and 659 being formed from the relationship or tying words input into the system. For example in the first statement "My name is John Doe" the relationship or tying word is "is". In the second statement "I have a car" the relationship or tying word is "have". In the third statement, "I have a blue car" the relationship or tying word is "have" and in the fourth statement "My car has wheels" the term "has" is the relationship or tying word.

From these relationships, the system such as microprocessors 202 and 203 can then create questions or statements related to these relationship patterns. For example, the system such as microprocessors 202 and 203 can transform these previous statements into a new question "John Doe, does your new car have blue stripes on its wheels to match your car?" While this question is an example of one type of question many different types of questions can be created by the system if necessary based upon these relationships. Alternatively or in addition, the system such as microprocessors 202 and 203 can also create statements derived from these relationships. A statement could be "John, I will look for additional materials for your blue car." This statement is an exemplary statement which results from the transformation of the initial data, and relationships which are then used to construct new statements as well. These constructed statements or commands taken from the relationship models or known lemma words are then used to create responses to questions and paths and steps in the subroutines such as subroutine 600.

Figure 6C:
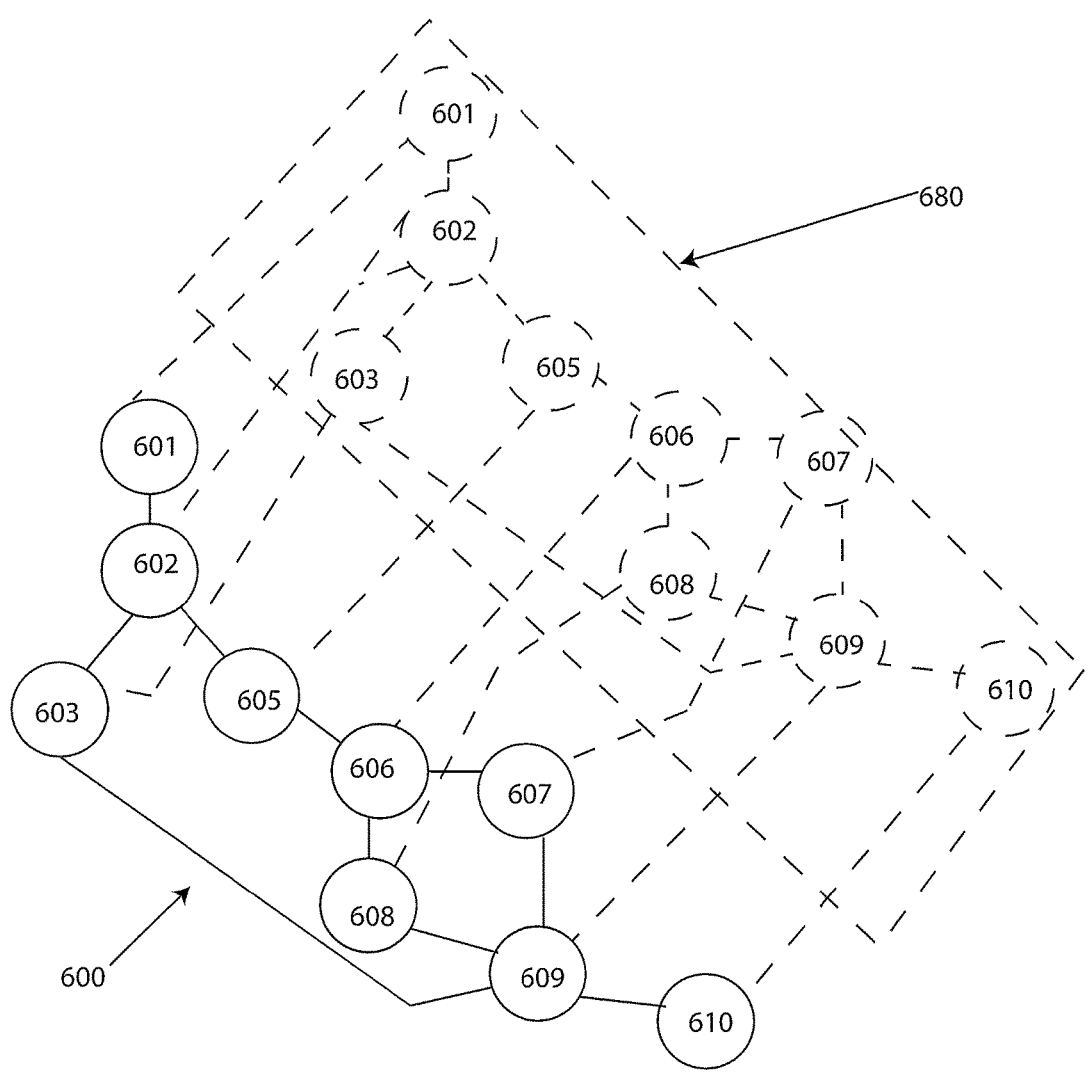
FIG. 6C shows a flow chart matching two different subroutine structures.

FIG. 6C shows the subroutine 600 being matched with another pre-set subroutine 680 which is stored in a database which can be stored in any one of database servers 331, and/or 332. As long as each step from a newly constructed or live subroutine 600 matches a corresponding step of a stored subroutine such as subroutine 680, the system proceeds forward. However, if the different subroutines 600 and 680 do not match then the system such as microprocessors 202 and/or 203 initiates a step to contact an outside agent such as that shown in step 610 or in step 504 (See FIG. 5).

Depending on user reviews and whether issues with the user or users have been resolved, newly constructed subroutine 600 can be stored in a database such as in database servers 331 and 332 as a stored or pre-set subroutine 680 to be matched against future newly constructed subroutines.

When constructing each step or branch of a subroutine, the system such as microprocessors 202 and/or 203 can use a predictive model for constructing each branch and each step. For example, if the system has an answer to a question, which in 100% of the time leads to a next step then the next step from the stored subroutine 680 is automatically applied. A likelihood of less than 100% can be pre-set by the system for applying a prospective next step. For example in at least one embodiment the pre-set likelihood could be 90% or higher, or 80% or higher or 75% or higher, or 70% or higher or 60% or higher or 51% or higher etc. before the system sets a prospective next step. Alternatively if the likely matching or success rate is below this pre-set amount, the system could proceed to contacting an outside agent as the next likely step would be unclear.

Thus, there is a database in any one of database servers 331 and 332 with pre-designated tying or relationship words which allow these objects to be tied together. Thus once the data is input, the system such as microprocessor 202 or 203 scans the input for tying words to create a relationship structure between the different objects. Once this relationship is formed, it is used to help with the decisions relating to the subroutines shown in FIG. 6A.

The system basically comprises a distributed system wherein each of the different modules described above can be housed on a different application server such as any one of application servers 331 or 332. Depending on the functions performed by these servers, these application servers can include additional non-traditional computer components such as an additional video compression module 209, or an additional audio analysis/compression module 210.

In addition, since these modules are set forth in at least one embodiment, in a distributed layout, the functioning of the computer hardware can be configured so that the system operates more efficiently with particular components preloaded into memory for faster processing.

In addition, since this computerized system is configured to directly connect and control a telephone call in a telephone switching network (such as PBX) the system is therefore configured to control outside components of this network.

Furthermore, the decision to control a telephone switching network can be based upon transformed information which is transformed by the microprocessor from initial data input into data structures such as subroutines shown in FIG. 6A or relationship structures shown in FIG. 6B.

Figure 7A:
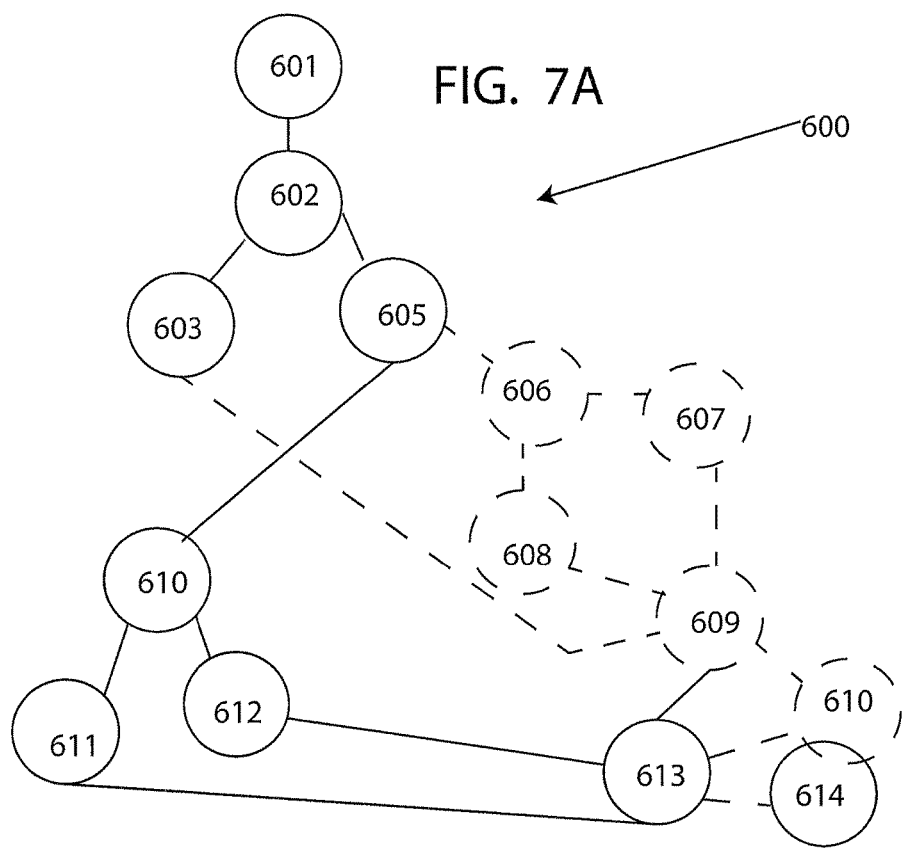
FIG. 7A is a flow chart showing a grafted subroutine.

FIG. 7A is a flow chart showing a grafted subroutine 701. For example, in this view there is shown additional steps 610-613 grafted onto the process shown in FIG. 6A. These additional steps include the previous steps 601-605. However, at some point during the process such as at step 605, the statement issued by the user is different than the statement issued by the user in FIG. 6A, then the system could branch or graft a series of steps off of this process and thus proceed to step 610 wherein the system such as microprocessor 202, 203 would then decide to either issue another command 611 or another question in step 612 to the user. If the answer to this question results in an end to a recognizable decision tree or subroutine then the process can proceed to step 614 which would then refer the user to an outside agent. Step 614 is shown extending over step 610 or overlapping step 610 because if the system determines that steps 614 and 610 are identical it can merge these two steps into one final step such as a single step 610 or a single step 614. The system can determine that these two steps are the same if as a consequence of step 613 the only option is step 614 and as a consequence of step 609 the only step is 610 and the operation performed by the system in steps 610 and 614.

Figure 7B:
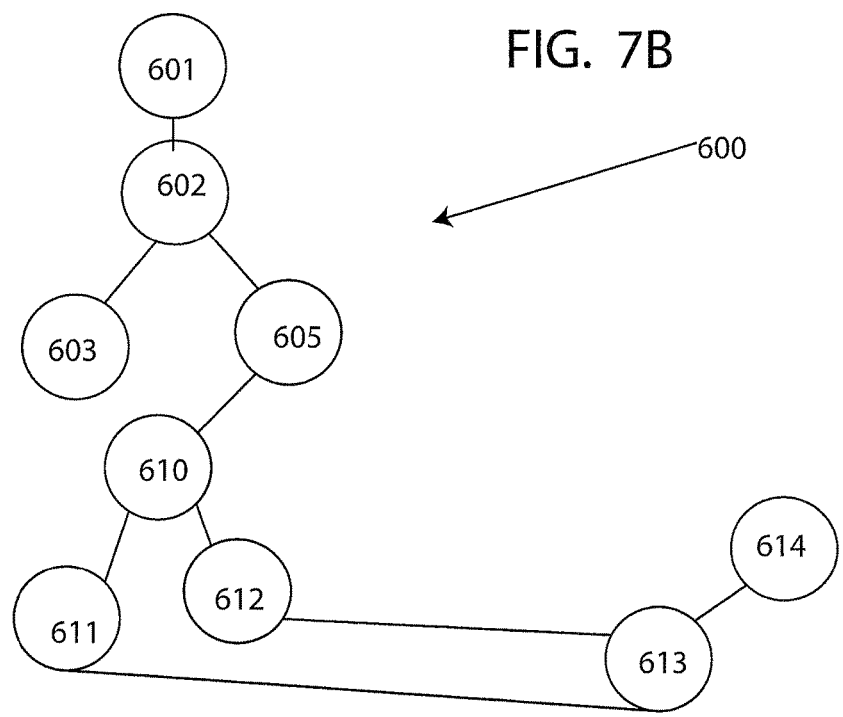
FIG. 7B is a flow chart showing a pared down and grafted subroutine.

FIG. 7B is a flow chart showing a pared down and grafted subroutine 702. For example, with this version, there are the same new steps, however steps 606-610 have been removed from the process. By either grafting or paring out steps, the system such as microprocessor(s) 202 and/or 203 can have a streamlined approach to resolving issues for a user. By grafting additional steps onto an existing process, the system can engage in fewer processing steps using less memory and less computing power. Instead of making decisions at each step, if the system uses a pre-tested method, then these fewer steps, or pre-organized steps would make the system and the process operate more efficiently.

Figure 8A:
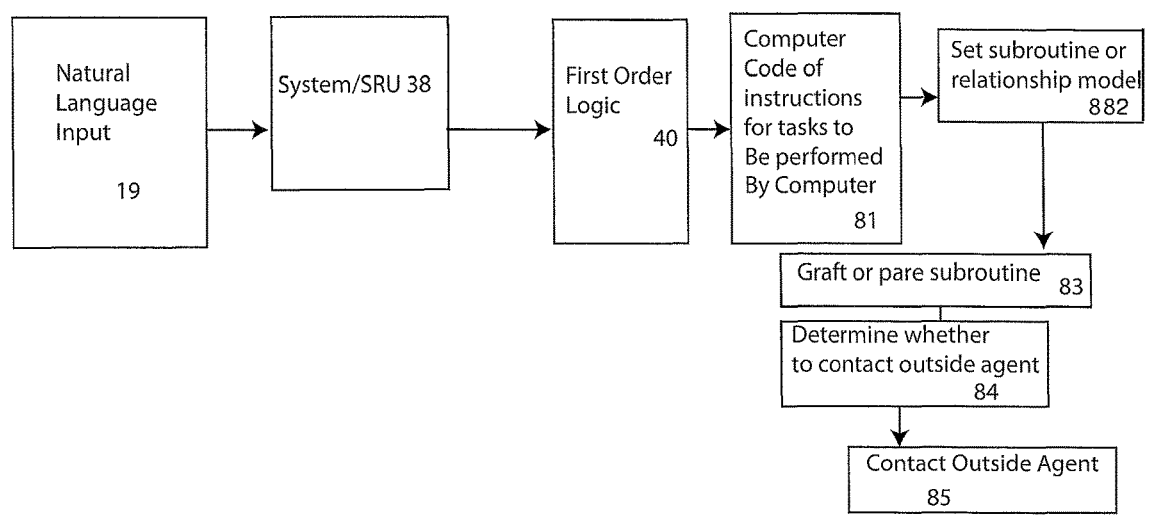
FIG. 8A is a flow chart showing an example of the information transformation from natural language into computer code or instructions.

FIG. 8A is a flow chart showing an example of the information transformation from natural language into computer code. For example information can be input into the system as natural language input in step 19. Next the information is fed into a semantic role understanding module 38 so that the information is parsed based upon known lemmas (see FIG. 1A) or sent to a first order logic module 40. The first order logic module transposes or transforms this input information into a new set of data which becomes a set of computer code or set of computer instructions. This results in at least one or a series of tasks to be performed in step 81. For example, at least one task is asking a question of the user. Another task lies in interpreting an answer provided by the user, which could be in the form of another question or a declarative statement. Another task involves performing an operation in following a declarative statement or following an imperative command. Next, in step 882 the system can then set the subroutine or relationship model such as those set and shown in FIGS. 6A and 6B. Once the system determines the proper subroutine or base subroutine it can the either select to branch off of this subroutine or pare the subroutine in step 83. Next, once it proceeds through these steps 882 and 83, initially, it can selectively cycle back through these two steps until the user's issue is resolved or until it is time for the system to decide to contact an agent in step 84. At this point, the system can then switch on a telephone signal connection through a telephone network such as a (POTS) public telephone system or through a computerized system to contact an outside agent in step 85. Thus, an outside agent in this step is contacted and this live outside agent can then be used to further resolve this issue. When the agent is contacted, this subroutine map shown in FIG. 6A, 7A, or 7B can then be passed to the agent showing the agent the different steps taken to this point. Further decisions made by the agent are then recorded and can then be used in future iterations to resolve future issues for users. These decisions made by a live agent can be grafted onto an existing subroutine structure, and also the system can pare off additional steps that are not necessary.

Figure 8B:
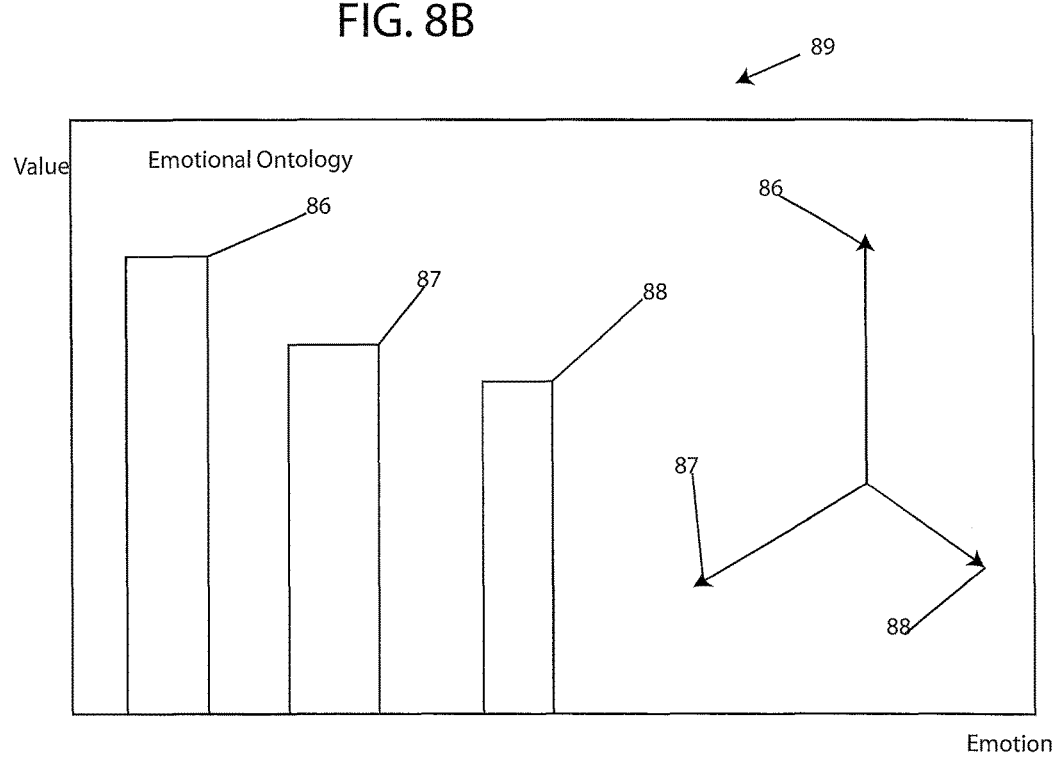
FIG. 8B shows a graph of an example of the factors for emotional ontology.

FIG. 8B shows a graph 89 of an example of the factors for emotional ontology. This graph indicates that different factors are used to help interpret and determine the nature of the answers or input provided. For example the three factors being evaluated that of pleasure 86, arousal 87 and dominance 88 are evaluated based upon the type of words used in speech, the tone of the speech and the volume or amplitude of the input speech. By gauging these factors and providing a composite score such as a PAD Score (Pleasure, Arousal, Dominance Score) the system can then determine based upon this composite score which decision to make and/or which path to follow. The reading of this PAD Score can be from pitch, tone, frequency of the read voices through the use of words, or perspective in conversation or other user input into the system.

Other factors which can be used to choose the most appropriate subroutine such as that shown in FIGS. 6A-7B are based upon the user evaluations of the system after the user has his issue resolved. For example, if multiple different processes are used to resolve an issue, the process that has the highest weighted average for resolving an issue would then be used to select for that particular process. Other factors would be the time it takes to resolve an issue, the amount of computing power necessary to resolve an issue (such as speed, processing power, total energy, memory etc.), or alternatively the total cost for resolving an issue which can include the amount of processing power or energy to resolve the issue coupled with the amount of outside assistance (in time or man or woman hours) in resolving the issue. All of these factors can be stored in a database such as in database servers 331 and 332, and be used to select the most appropriate subroutine to resolve a particular issue.

As each new issue is raised by a user, the system can start with a blank slate or blank storage of memory and then transform input information to create data structures that are used to aid in resolving these issues. These subroutines which are shown in FIGS. 6A-7B can also be presented either in a print-out or on a computer screen for viewing to show or teach others in the proper process for aiding a user. Thus, each step of these subroutine models such as model 600 or 680 can be presented sequentially on a screen in the order that the task or step is completed. Thus, each action by the system is recorded and then transformed or constructed on a screen for viewing by a user.

There can also be a an article of manufacture such as a computer readable or usable medium such as any one of a memory such as memory 204 a microprocessor such as microprocessor 202 or 203 or a mass storage device 205 alone or together on which is stored a computer readable program code means which is embodiment therein and comprising:

Computer readable program code means for causing the computer to connect the user with a computer network; computer readable program code means for presenting the user with a plurality of questions; computer readable program code means for analyzing a plurality of answers provided by the user by comparing the plurality of answers with a plurality of answers stored in a database; computer readable program code means for transforming information input from the user into at least one of a subroutine or a relationship model; computer readable program code means for determining using a microprocessor whether to connect a user with a live agent based upon the subroutine or relationship model; and computer readable program code means for connecting the user with a live agent by switching to a telephone network after determining via a predetermined score that the user needs further assistance.

Accordingly, while at least one embodiment of the present invention has been shown and described, it is obvious that many changes and modifications may be made thereunto without departing from the spirit and scope of the invention.

What is claimed is:

1. A computerized process implemented within a call center for assisting a user in obtaining help with issues comprising the following steps:
  receiving information provided by the user in natural language, the information comprises at least three words;
  determining a statement type for the information provided by the user, the statement type is one of either declarative, interrogative, or imperative;
  transforming information received from the user into a first subroutine based on the statement type and a relationship model, the relationship model includes an indication of tying words in the information;
  retrieving from memory a second subroutine based on whether the information is declarative, interrogative, or imperative;
  for each step in the first and second subroutines, if a current step in the first subroutine matches a current step in the second subroutine, execute the current step in the first subroutine by outputting a natural language response to the user, wherein the natural language response includes at least a portion of the information provided by the user and proceed to the next step in both the first and second subroutines, otherwise i) for the current step in the first subroutine and the current step in the second subroutine that have identical meaning, merge the current step in the first subroutine and the current step in the second subroutine and replace the current step in the second subroutine with the merged step and ii) connect the user with a live agent via a telephone network or internet to establish a two way communication between the user and the live agent.

2. The process as in claim 1 further comprising the step of determining a score for efficiency in resolving a user's issue based upon a time period and number of questions and answers necessary to resolve the issue.

3. The process as in claim 2, wherein said step of determining a score includes determining a score based upon emotional reaction of the user.

4. The process as in claim 3, further comprising the step of retaining said subroutine for resolving an issue by presenting said subroutine on a computer screen when said issue is presented by said user.

5. The process as in claim 4, further comprising the step of using said microprocessor to modify a subroutine path by recording either a different step in said path or adding additional steps in said path after connecting the user with the live agent to form a transformed subroutine.

6. The process as in claim 5, further comprising the steps of providing an index which is used by said microprocessor to determine whether the sentence is a declarative sentence, an interrogative sentence or an imperative sentence.

7. The process as in claim 5, further comprising the steps of providing a pre-set subroutine, which is used by said microprocessor to determine a best course of action in assisting a user in resolving an issue by matching said pre-set subroutine with said transformed subroutine based upon information input from said user.

8. The process as in claim 5, wherein said step of determining a sentence type comprises using a neural cognition device comprising a microprocessor to determine a type of sentence issued by the user.

9. The process as in claim 8, wherein said step of determining a type of sentence issued by the user comprises using a semantic role understanding machine to determine a type of sentence.

10. The process as in claim 8, further comprising the step of using a first order logic to answer any interrogative question presented by the user.

11. The process as in claim 8, further comprising the step of determining a known lemma of an imperative statement and then selectively invoking an invocation service based upon a type of lemma.

12. The process as in claim 8 further comprising the step of invoking a dialog management service to provide answers to users based upon the types of sentences input by the user wherein said dialog management service provides natural language statements to users.

13. The process of claim 1 wherein the natural language response also includes at least a portion of the relationship model.

* * * * *